US012581266B2

(12) United States Patent
Bharitkar et al.

(10) Patent No.: US 12,581,266 B2
(45) Date of Patent: Mar. 17, 2026

(54) DEEP LEARNING BASED VOICE EXTRACTION AND PRIMARY-AMBIENCE DECOMPOSITION FOR STEREO TO SURROUND UPMIXING WITH DIALOG-ENHANCED CENTER CHANNEL

(71) Applicant: Samsung Electronics Co., Ltd., Suwon-si (KR)

(72) Inventors: Sunil Bharitkar, Stevenson Ranch, CA (US); Ricardo Thaddeus Páez Amaro, Puebla (MX); Carlos Tejeda Ocampo, Tuxtla Gutierrez (MX); Luis Madrid Herrera, Chihuahua (MX)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/399,148

(22) Filed: Dec. 28, 2023

(65) Prior Publication Data

US 2024/0267701 A1 Aug. 8, 2024

Related U.S. Application Data

(60) Provisional application No. 63/443,769, filed on Feb. 7, 2023.

(51) Int. Cl.
*H04S 7/00* (2006.01)
*H04S 3/00* (2006.01)

(52) U.S. Cl.
CPC .............. *H04S 7/307* (2013.01); *H04S 3/008* (2013.01); *H04S 7/302* (2013.01);
(Continued)

(58) Field of Classification Search
CPC .......... H04S 3/008; H04S 7/307; H04S 7/302; H04S 2400/01; H04S 2400/03;
(Continued)

(56) References Cited

U.S. PATENT DOCUMENTS 9,053,700 B2 * 6/2015 Neusinger ............. G10L 19/008
9,093,063 B2 7/2015 Mlkamo et al.
(Continued)

FOREIGN PATENT DOCUMENTS

CN 114203163 A 3/2002
CN 112866896 B 7/2022
(Continued)

OTHER PUBLICATIONS

International Search Report and Written Opinion dated May 2, 2024 for International Application PCT/KR2024/001539, from Korean Intellectual Property Office, pp. 1-11, Republic of Korea.
(Continued)

*Primary Examiner* — Paul Kim

(74) *Attorney, Agent, or Firm* — Sherman IP LLP; Kenneth L. Sherman; Steven Laut

(57) ABSTRACT

One embodiment provides a computer-implemented method that includes determining directional sounds from a content mix using a machine learning unmixing model. The directional sounds are panned in an upmixed signal. Signal-dependent upmixing gains for specific frequency bins are computed on a frame-basis using a machine learning model for the upmixed signal. Dedicated voice clarity gains are computed using a hearing impairment model for multiple hearing-impaired profiles for achieving dialog enhancement. The signal dependent upmixing gains and voice clarity gains are transmitted as metadata with a downmixed signal representing the content mix.

20 Claims, 8 Drawing Sheets

(52) U.S. Cl.
CPC ....... *H04S 2400/01* (2013.01); *H04S 2400/03* (2013.01); *H04S 2400/05* (2013.01); *H04S 2400/11* (2013.01); *H04S 2400/13* (2013.01)

(58) Field of Classification Search
CPC ............. H04S 2400/05; H04S 2400/11; H04S 2400/13; H04R 2205/041
USPC .......................................................... 381/303
See application file for complete search history.

(56) References Cited

U.S. PATENT DOCUMENTS

| | | | | |
|---|---|---|---|---|
| 9,393,412 | B2 | 7/2016 | Strahl et al. | |
| 10,362,426 | B2 | 7/2019 | Wang et al. | |
| 10,453,464 | B2 | 10/2019 | Wang et al. | |
| 10,650,836 | B2 * | 5/2020 | Wang | G10L 19/008 |
| 11,089,423 | B2 | 8/2021 | Kim et al. | |
| 11,297,454 | B2 | 4/2022 | Said | |
| 11,470,438 | B2 | 10/2022 | Uhle et al. | |
| 11,564,048 | B2 | 1/2023 | Bramslow | |
| 2022/0392461 | A1 | 12/2022 | Giron et al. | |
| 2023/0105623 | A1 | 4/2023 | Fukui et al. | |

FOREIGN PATENT DOCUMENTS

| | | | |
|---|---|---|---|
| CN | 115315747 | A | 11/2022 |
| WO | 2022-200136 | A1 | 9/2022 |
| WO | 2023-118078 | A1 | 6/2023 |

OTHER PUBLICATIONS

{Grace Period Disclosure}: “Deep Learning Based Voice Extraction And Primary-Ambience Decomposition For Stereo To Surround Upmixing,” Ricardo Thaddeus Paez-Amaro, Carlos Tejeda-Ocampo, Ema Souza-Blanes, Sunil Bharitkar, and Luis Madrid-Herrera, 154th Convention, May 13-15, 2023, pp. 1-8, Espoo, Helsinki, Finland.

World Health Organization, “Deafness and Hearing Loss”, Feb. 27, 2023, pp. 1-5, downloaded Dec. 15, 23 from: https://www.who.int/news-room/fact-sheets/detail/deafness-and-hearing-loss, United States.

Monson, BB et al., “The perceptual significance of high-frequency energy in the human voice”. Front Psychol. Jun. 16, 2014, 2014, pp. 1-11, Article 587, Switzerland.

Karjalainen, M. et al., “Warped filters and their audio applications,” Proc. 1997 IEEE Int. Workshop Applications of Signal Processing to Audio & Acoustics, Oct. 19, 1997, pp. 1-4, IEEE, United States.

* cited by examiner

DEEP LEARNING BASED VOICE EXTRACTION AND PRIMARY-AMBIENCE DECOMPOSITION FOR STEREO TO SURROUND UPMIXING WITH DIALOG-ENHANCED CENTER CHANNEL

CROSS-REFERENCE TO RELATED APPLICATIONS

This application claims the priority benefit of U.S. Provisional Patent Application Ser. No. 63/443,769, Feb. 7, 2023, which is incorporated herein by reference in its entirety.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): Deep Learning Based Voice Extraction And Primary-Ambience Decomposition For Stereo To Surround Upmixing, Ricardo Thaddeus Piez-Amaro, Carlos Tejeda-Ocampo, Ema Souza-Blanes, Sunil Bharitkar, and Luis Madrid-Herrera, 154$^{th}$ Convention, May 13-15, 2023, Espoo, Helsinki, Finland, pp 1-8.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to multimedia content upmixing, and in particular, to a deep learning based upmixing using a strategy combining voice extraction and primary-ambience decomposition.

BACKGROUND

Surround systems have gained popularity in home entertainment despite the fact that most of the cinematic content is delivered in two-channel stereo format. Although there are several upmixing options, it has proven challenging to deliver an upmixed signal that approximates the original directionality and timbre intended by the mixing artist.

SUMMARY

One embodiment provides a computer-implemented method that includes determining directional sounds from a content mix using a machine learning unmixing model. The directional sounds are panned in an upmixed signal. Signal-dependent upmixing gains for specific frequency bins are computed on a frame-basis using a machine learning model for the upmixed signal. Dedicated voice clarity gains are computed using a hearing impairment model for multiple hearing-impaired profiles for achieving dialog enhancement. The signal dependent upmixing gains and voice clarity gains are transmitted as metadata with a downmixed signal representing the content mix.

Another embodiment includes a non-transitory processor-readable medium that includes a program that when executed by a processor performs dialog enhancement of extracted sources of an upmixed signal, including determining, by the processor, directional sounds from a content mix using a machine learning unmixing model. The processor pans the directional sounds in an upmixed signal. The processor further computes signal-dependent upmixing gains for specific frequency bins on a frame-basis using a machine learning model for the upmixed signal. The processor still further computes dedicated voice clarity gains using a hearing impairment model for multiple hearing-impaired profiles for achieving dialog enhancement. The signal dependent upmixing gains and voice clarity gains are transmitted as metadata with a downmixed signal representing the content mix.

Still another embodiment provides an apparatus that includes a memory storing instructions, and at least one processor executes the instructions including a process configured to determine directional sounds from a content mix using a machine learning unmixing model. The directional sounds are panned in an upmixed signal. Signal-dependent upmixing gains are computed for specific frequency bins on a frame-basis using a machine learning model for the upmixed signal. Dedicated voice clarity gains are computed using a hearing impairment model for multiple hearing-impaired profiles for achieving dialog enhancement. The signal dependent upmixing gains and voice clarity gains are transmitted as metadata with a downmixed signal representing the content mix.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
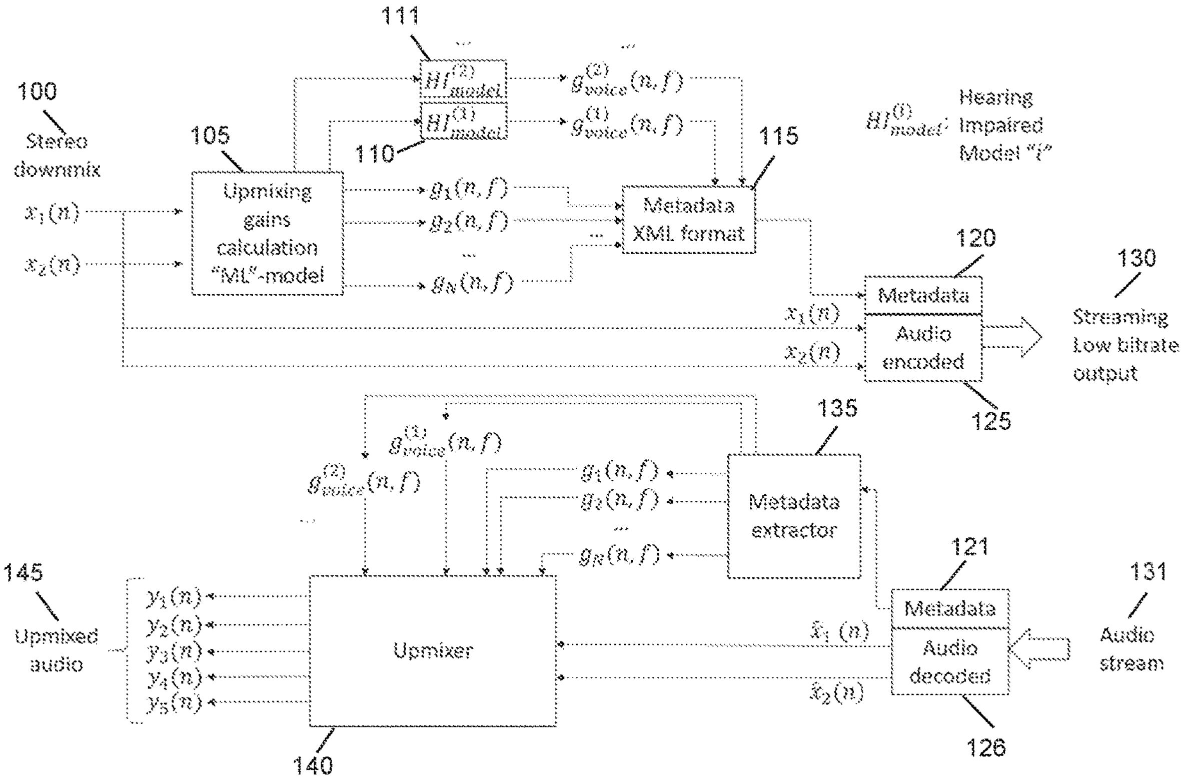
FIG. 1 illustrates a block diagram of an upmixing system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to multimedia content upmixing, and in particular, to a deep learning based upmixing using a strategy combining voice extraction and primary-ambience decomposition. One embodiment provides a computer-implemented method that includes determining directional sounds from a content mix using a machine learning unmixing model. The directional sounds are panned in an upmixed signal. Signal-dependent upmixing gains for specific frequency bins are computed on a frame-basis using a machine learning model for the upmixed signal. Dedicated voice clarity gains are computed using a hearing impairment model for multiple hearing-impaired profiles for achieving dialog enhancement. The signal dependent upmixing gains and voice clarity gains are transmitted as metadata with a downmixed signal representing the content mix.

With conventional techniques, actual methods present general phasiness when outside the sweet spot; speech is also degraded due to improper voice extraction from a complex mixture of sources. The conventional techniques: do not support speech enhancement processing; do not perform well when input channels are already uncorrelated; do not sound natural; are designed for a particular type of content (e.g., music); are not applicable for hearing-impaired people typically found due to age-related hearing loss. Additionally, high-frequency energy has been traditionally neglected in speech perception research and enhancement. One or more embodiments address this overlooked component of human perception to bring greater accessibility.

Multichannel surround home theatres have become more accessible to consumers. Most audiovisual content, however, remains in stereo format. Since playing stereo content in surround systems does not offer the best possible listening experience, upmixing techniques have been used to derive signals in surround formats (e.g., 5.1, 7.1, 7.1.4) from an original 2-channel mix. Upmixing is the process where audio content of m channels is mapped into n channels, where n>m. These n-channels should be able to be played in a surround speaker setup and provide a better immersive experience to the listener than plain stereo. Some embodiments include the Voice-Primary-Ambience Extraction Upmixing (VPA) methodology. In one or more embodiments, VPA focuses on upmixing from two to five channels. VPA can comprise three main blocks: a hearing model to generate frequency depending gains of one or several Hearing Impairment (HI) models using vocal extraction, primary-ambience decomposition, and upmix rendering.

Some embodiments employ extraction of speech from a stereo signal; apply dialog enhancement; render speech to a center channel; time-frequency analysis of voice extracted signals; synthesizing frequency-dependent gains based on hearing loss profile(s); coding of frequency-dependent gains as metadata to be sent with downmixed signals and voice/ambience upmixing parameters (e.g., along with, alongside, in conjunction with, in a same transmission, etc.); decoding and extracting metadata parameters based on Hearing Impairment (HI) profile; applying voice/speech frequency-dependent gain (viz., metadata parameters) using a hearing loss profile; and the hearing loss profile identified by the consumer (e.g., with television (TV)/soundbar remote, TV interface, etc.).

FIG. 1 illustrates a block diagram of an upmixing system, according to some embodiments. In some embodiments, the stereo downmix 100 ($x_1(n)$ and $x_2(n)$) is input to an ML model 105 for upmixing gains calculations. The output from block 105 including gains $g_1(n, f)$ through $g_N(n, f)$ and output gains ($g_{voice}^{(1)}(n, f)$ and $g_{voice}^{(2)}(n, f)$) from hearing-impaired (HI) models ($HI_{model}^{(1)}$ 110 and $HI_{model}^{(2)}$ 111) are entered into a metadata extensible markup language (XML) format process 115.

The output from the XML format process 115 and the stereo downmix 100 are processed to result in encoded metadata 120 and audio encoded 125, which results in a streaming low bitrate output 130. The streaming low bitrate output 130 is processed into decoded metadata 121 and audio decoded 126. A metadata extractor 135 extracts the decoded metadata 121 from the decoded audio stream 131 (resulting from the streaming low bitrate output 130) while the audio signals ($\hat{x}_1(n)$ and $\hat{x}_2(n)$) from the audio decoded 126 and the gains ($g_{voice}^{(1)}(n, f)$, $g_{voice}^{(2)}(n, f)$, and $g_1(n, f)$ through $g_N(n, f)$) are processed by upmixer 140. The output from the upmixer 140 is upmixed audio 145 ($y_1(n)$ to y5(n)). In some embodiments, dedicated frequency-dependent gains are derived for dialog based on different HI profiles. In some embodiments, the HI profiles may be tailored to specific languages.

Unmixing refers to the process of separating the different sources which comprise a signal. In some embodiments, directional sounds (e.g., $x_1(n)$ and $x_2(n)$) are determined from a content mix using an ML unmixing model to separate the channels to the stereo downmix 100. In one or more embodiments, determining directional sounds may be performed by isolating, identifying, detecting, extracting, etc. The nature of the audio sources present varies depending on the type of audio signal being upmixed. In music, the common sources are predictable to a certain extent: vocals, guitar, keyboard, bass, drums, among others. In cinematic content, however, there could be an unpredictable number of sources of different kinds. This makes it unfeasible to implement a broader sound separation approach for cinematic content upmixing. The most common approach to perform unmixing is by finding source patterns in the mix spectrogram and extracting them through a mask. There are different methods to achieve this, such as harmonic-percussive separation (HPS), non-negative matrix factorization (NMF), or neural networks. For example, OpenUnmix (UMX) is a Deep Learning model, trained for a source separation task in a musical context. In some embodiments, a vocals model (separation model) with pre-trained weights may be implemented. In one or more embodiments, although the vocals model is trained to extract singing voices, it also performs well extracting speech from cinematic content. The vocal reverberation, however, is not included in the extracted speech signal but is found in the residual signal in both cinematic and musical content cases. The core of the vocals model architecture may include a multi-layer bidirectional long short-term memory (BiL- STM) neural network (NN). The vocals model architecture may take as input the short-time Fourier transform (STFT) spectrogram of the mix, crops it to (e.g., 16 kHz), passes it through a fully connected layer, then through the BiLSTM, and two more fully connected layers, including additionally a skip connection right before and after the BiLSTM. Finally, the vocals model reshapes the output to match the original STFT shape and outputs a mask, which will be applied to the original spectrogram to perform the actual source extraction.

VPA uses an Equal-Levels Ambience Extraction (ELAE) algorithm. ELAE is based on the following assumptions: (i) an input signal is the result of adding up a primary (directional) component and ambience; (ii) in a stereo signal, the primary components are uncorrelated with their ambience, and the ambience signals are uncorrelated with each other; (iii) the correlation coefficient of the primary components is 1; (iv) ambience levels in both channels are equal; (v) it is possible to extract the ambience through a mask. Using the above assumptions and the physical constraint that the total ambience energy has to be lower than or equal to the total energy it is possible to find the masks as a function of the channels' cross-correlation and auto-correlations.

In some embodiments, the ML model 105 employs VPA processing. VPA can comprise three main blocks: voice extraction, ambience extraction and upmix rendering. The first block includes the pretrained vocals model as a source extractor. The first block receives the stereo downmix and produces a 4-channel audio, i.e., the concatenation of the extracted voice in stereo ($[V_L;V_R]$) with the residual also in stereo ($[U_L;U_R]$). For the first block, s is referred to as the stereo input signal with sL and sR being its left and right channels, respectively.

$$[V; U] = \text{Vocals Model}(s) \qquad \text{(Eq. 1)}$$

where V is the extracted voice, and U is the residual of s after removing V. The second block is the Primary-Ambience decomposition block, which is performed just over the residual U using ELAE.

$$[P; A] = ELAE(U) \qquad \text{(Eq. 2)}$$

where P contains the primary component of U and A contains the ambience of the residual U. Next, the upmix rendering block. Before obtaining the upmixed signal $\hat{s}$, the pre-upmixed channels $\bar{s}\{L, R, C, L_S, R\}$ are generated as follows. $\bar{S}_L$ is the mix of $V_L(g_1(n, f)=-48\text{ dB})$ and $P_L(g_2(n, f)=-1\text{ dB})$. Likewise, $\bar{S}_R$ is the mix of $V_R(g_3(n, f)=-48\text{ dB})$ and $P_R(g_4(n, f)=-1\text{ dB})$. Then, $A_L(g_5(n, f)=+12\text{ dB})$ and $A_R(g_6(n, f)=+12\text{ dB})$ are decorrelated through a 64th-order all-pass filter to get $\bar{S}_{Ls}$ and $\bar{S}_{Rs}$, respectively. Decorrelation is applied to broaden the sound and extend the surrounding perception accordingly. Center channel $\bar{S}_C$ is the downmix of stereo voice $V(g_7(n, f)=-3\text{ dB})$ and the stereo primary component $P(g_8(n, f)=-48\text{ dB})$. A $g_9(n, f)=2$ dB bass cut is applied to frontal channels ($\bar{S}_L$, $\bar{S}_R$, $\bar{S}_C$) and a $g_{10}(n, f)=2$ dB bass boost to the rear channels ($\bar{S}_{Ls}$, $\bar{S}_{Rs}$), using a low-pass shelving filter with slope of 0.8 and half-gain frequency at 250 Hz.

In order for VPA to be implemented in a consumer application it needs to be performed in real time. To achieve this, some embodiments employ a windowed approach, where small chunks of the audio are processed in overlapping slices. In one example embodiment, a window size of W=4096 with an overlap O=512 samples may be employed (other window sizes may also be employed as desired). In some embodiments, a deep learning model is trained using STFT windows with 4096 samples and overlap of 3072 samples, that configuration is maintained in the internal vocals model block; and for the ELAE's internal STFT some embodiments use a 128-sample window with 96 overlapping samples. To address the border artifacts, inherent to the STFT process and due to the rears' decorrelation, the last cE=96 samples of each window and the first cS=416 samples of the next window are taken out before concatenating them. The pseudocode for this approach is as follows:

```
Input: s
Output: upmix
Require :s≥ 4096
W ← 4096;
O ← 512;
cS ← 416;
cE ← 96;
N ← (len(s)− O)/(W − O);
for n ← 1 to N do
   startIdx ← (n − 1)(W − O)+1;
   endIdx ← startIdx + W − 1;
   ŝ ← VPA(s[startIdx : endIdx]);
   if n is 1 then
      upmix[startIdx : endIdx] ← ŝ;
   else
      upmix[startIdx+cS : endIdx − cE] ←;
      ŝ [1+cS : end − cE];
   end
end,
```

where N is the total number of processed windows, s is the upmixed signal corresponding to the current window, and upmix is the final output with the complete upmixed signal.

In some embodiments, the baseline gain $g_i(n,f)$ computations are moved upstream for the upmixer 140 and these baseline gains are transmitted as metadata. One or more embodiments employ ML processing for determining baseline gains from content (e.g., a regression ML model, etc.) may be employed. Some embodiments include various hearing loss profiles for computing time-varying hearing-loss gains $g_{voice}(n,f)$, which are applied to the center channel. Listening tests on a HI population sample may provide or inform of the values of these hearing-loss gains. Different individuals may likely have different hearing loss profiles (e.g., some exhibit loss starting say 4 kHz others at 8 kHz). These hearing loss gains are applied in conjunction to or will replace the baseline gains for HI people. These hearing-loss gains may be constant values or $g_{voice}(n,f)=EQ(n, f)$, where EQ(n,f) is an equalization filter over [20, 20000]Hz for a given frame index n. Optionally, frame-independent equalization may be applied to each HI model such that $g_{voice}(n, f)=EQ(f)$. Another way to achieve improvement to listening ability for hearing impaired profiles would be to apply dynamic range compression (DRC) and send the DRC parameters (compression ratio, threshold, and release-time constants) as parameters to enable dialog to be better heard by HI people. In some embodiments, the presets for this gain may be exposed to the end consumer and the gains would be tied specifically to enhancing the center-channel voice channel. An example of enhancing dialog for HI people is using ducking (attenuating other content relative to voice). In one or more embodiments, background noise (signal-to-noise ratio (SNR)) may be used as a modality to developing these gain presets. In some embodiments, instead of HI profiles, one could substitute with noise profiles before encoding. If monitoring reveals a background noise response, the appropriate preset gain $g_{voice}(n,f)$ corresponding to a noise profile closest to developing $g_{voice}(n,f)$ may be used.

Figure 2:
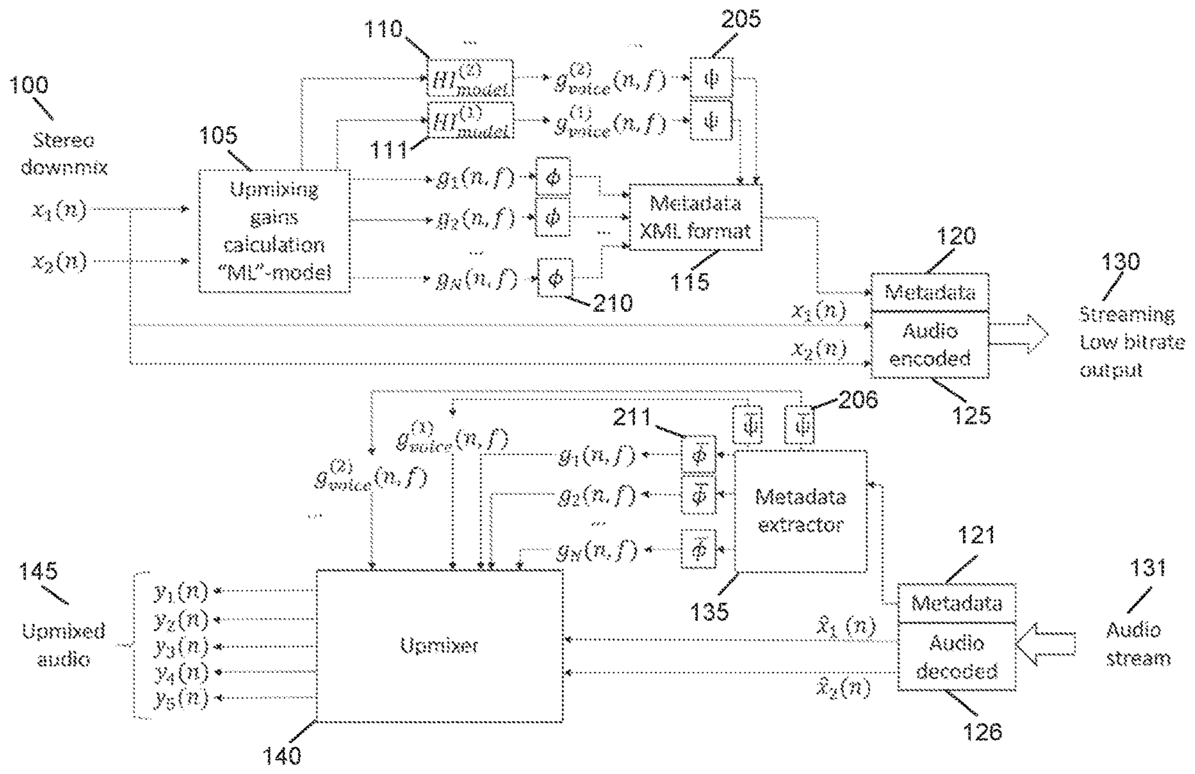
FIG. 2 illustrates a block diagram of another upmixing system, according to some embodiments.

FIG. 2 illustrates a block diagram of another upmixing system, according to some embodiments. In some embodiments, the stereo downmix 100 ($x_1(n)$ and $x_2(n)$) is input to an ML model 105 for upmixing gains calculations. The output from block 105 including gains $g_1(n, f)$ through $g_N(n, f)$ and output gains ($g_{voice}^{(1)}(n, f)$ and $g_{voice}^{(2)}(n, f)$) from HI models ($HI_{model}^{(1)}$ 110 and $HI_{model}^{(2)}$ 111). The $g_{voice}^{(1)}(n, f)$ and $g_{voice}^{(2)}(n, f)$ are input to metadata compression models Φ 205 (e.g., linear predictive coding (LPC), wavelet basis, etc.), and the gains $g_1(n, f)$ through $g_N(n, f)$ are input to metadata compression models ϕ 210 (e.g., LPC, wavelet basis, etc.). The output from the metadata compression models ψ 205 and ϕ 210 are entered into a metadata XML format process 115. The output from the XML format process 115 and the stereo downmix 100 are processed to result in encoded metadata 120 and audio encoded 125, which results in a streaming low bitrate output 130. The streaming low bitrate output 130 is processed into decoded metadata 121 and audio decoded 126. A metadata extractor 135 extracts the decoded metadata 121 from the decoded audio stream 131 (resulting from the streaming low bitrate output 130). The output from the metadata extractor 135 are input to metadata decompression models $\overline{\psi}$ 206 and metadata decompression models $\overline{\phi}$ 211. The output from the metadata decompression models $\overline{\psi}$ 206 are the gains ($g_{voice}^{(1)}(n, f)$, $g_{voice}^{(2)}(n, f)$ and the output from the metadata decompression models $\overline{\phi}$ 211 are the gains $g_1(n, f)$ through $g_N(n, f)$. The gains ($g_{voice}^{(1)}(n, f)$, $g_{voice}^{(2)}(n, f)$ and the gains $g_1(n, f)$ through $g_N(n, f)$ and the audio signals ($\hat{x}_1(n)$ and $\hat{x}_2(n)$) from the audio decoded 126 are processed by upmixer 140. The output from the upmixer 140 is upmixed audio 145 ($y_1(n)$ to y5(n)). In some embodiments, the gains $g_1(n, f)$ through $g_N(n, f)$ are modeled as:

$$g_i(n, f) \cong \frac{1}{\sum_{k=1}^{N} a_k^{(n)} z^{-k}},\ N \ll f_{max}$$

where $f_{max}$=# of bins. In one or more embodiments, the metadata compression/decompression models $\overline{\psi}$ 206 may be represented as:

$$\overline{\psi} = \frac{1}{\sum_{k=1}^{N} a_k^{(n)} z^{-k}}$$

where $a_k(n)$ are the linear prediction coefficients (LPC) used to model the time-frequency gains. Thus for a given time-frame a few parameters ($a_k$) may be used to represent the gain function that extends from 20-20,0000 Hz. The reduction enables smaller metadata packet-size for transmission in turn reducing bit-rate of the overall encoded content. At the decoder the LPC parameters are extracted and used to reconstruct "approximately" the frequency-dependent gain over that frame.

Figure 3:
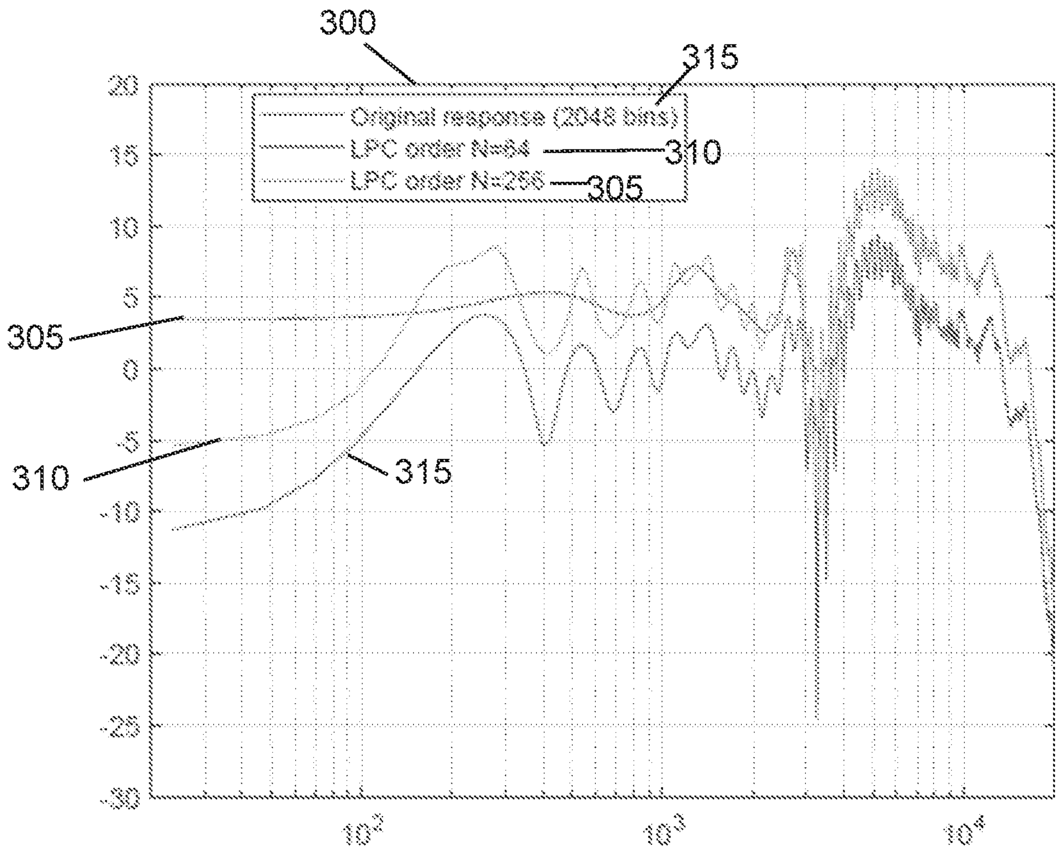
FIG. 3 illustrates a graph for comparison of gain functions, according to some embodiments.

FIG. 3 illustrates a graph 300 for comparison of gain functions, according to some embodiments. In one example embodiment, the original response 315 curve represents metadata gain values for 2048 fast Fourier transform (FFT) bins associated with a gain function g(n, f) at frame n. The LPC (order N=256) 305 curve represents gain function $\hat{g}(n, f)$ reconstructed with LPC order 64 (64 metadata coefficients transmitted instead of 2 k bin gain values). The LPC (order N=64) 310 curve represents gain function $\hat{g}(n, f)$ reconstructed with LPC order 256 (only 256 metadata coefficients transmitted instead of 2 k bin gain values).

Figure 4:
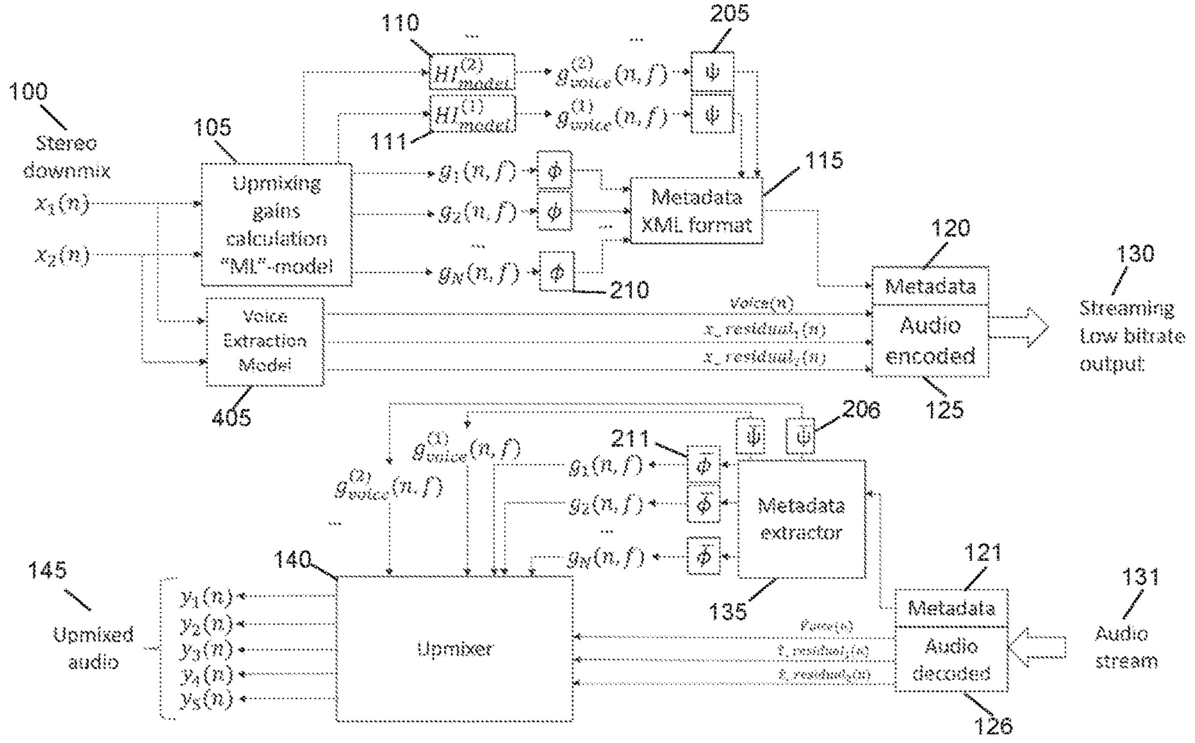
FIG. 4 illustrates a block diagram of still another upmixing system, according to some embodiments.

FIG. 4 illustrates a block diagram of still another upmixing system, according to some embodiments. In some embodiments, the stereo downmix 100 ($x_1(n)$ and $x_2(n)$) is input to an ML model 105 for upmixing gains calculations and also to a voice extraction model 405. The output from block 105 including gains $g_1(n, f)$ through $g_N(n, f)$ and output gains ($g_{voice}^{(1)}(n, f)$ and $g_{voice}^{(2)}(n, f)$) from HI models ($HI_{model}^{(1)}$ 110 and $HI_{model}^{(2)}$ 111). The $g_{voice}^{(1)}(n, f)$ and $g_{voice}^{(2)}(n, f)$ are input to metadata compression models ψ 205 (e.g., linear predictive coding (LPC), wavelet basis, etc.), and the gains $g_1(n, f)$ through $g_N(n, f)$ are input to metadata compression models ϕ 210 (e.g., LPC, wavelet basis, etc.). The output from the metadata compression models ψ 205 and ϕ 210 are entered into a metadata XML format process 115. The output from the voice extraction model 405 includes voice(n), $x\_residual_1(n)$ and $x\_residual_2(n)$. The output from the XML format process 115 is processed to result in encoded metadata 120. The output from the voice extraction model 405 is processed to result in audio encoded 125, which results in a streaming low bitrate output 130. The streaming low bitrate output 130 is processed into decoded metadata 121 and audio decoded 126. A metadata extractor 135 extracts the decoded metadata 121 from the decoded audio stream 131 (resulting from the streaming low bitrate output 130). The output from the metadata extractor 135 are input to metadata decompression models $\overline{\psi}$ 206 and metadata decompression models $\overline{\phi}$ 211. The output from the metadata decompression models T 206 are the gains ($g_{voice}^{(1)}(n, f)$, $g_{voice}^{(2)}(n, f)$ and the output from the metadata decompression models $\overline{\phi}$ 211 are the gains $g_1(n, f)$ through $g_N(n, f)$. The output from the audio decoded 126 results in $\hat{v}$oice(n), $\hat{x}\_residual_1(n)$ and $\hat{x}\_residual_2(n)$. The gains ($g_{voice}^{(1)}(n, f)$, $g_{voice}^{(1)}(n, f)$, the gains $g_1(n, f)$ through $g_N(n, f)$ and the audio signals $\hat{v}$oice(n), $\hat{x}\_residual_1(n)$ and $\hat{x}\_residual_2(n)$ from the audio decoded 126 are processed by upmixer 140. The output from the upmixer 140 is upmixed audio 145 ($y_1(n)$ to y5(n)). In some embodiments, the gains $g_1(n, f)$ through $g_N(n, f)$ are represented as:

$$g_i(n, f) \cong \frac{1}{\sum_{k=1}^{N} a_k^{(n)} z^{-k}},\ N \ll f_{max}$$

where $f_{max}$=# of bins. In one or more embodiments, the metadata decompression models $\overline{\psi}$ 206 m ay be represented as:

$$\overline{\psi} = \frac{1}{\sum_{k=1}^{N} a_k^{(n)} z^{-k}}$$

where $a_k(n)$ are the linear prediction coefficients (LPC) used to model the time-frequency gains for the HI model output gains (note: these $a_k(n)$ are different than those for the upmixing coefficients). Thus for a given time-frame a few parameters ($a_k$) may be used to represent the gain function that extends from 20-20,0000 Hz. The reduction enables smaller metadata packet-size for transmission in turn reducing bit-rate of the overall encoded content. At the decoder the LPC parameters are extracted and used to reconstruct "approximately" the frequency-dependent gain over that frame.

Figure 5:
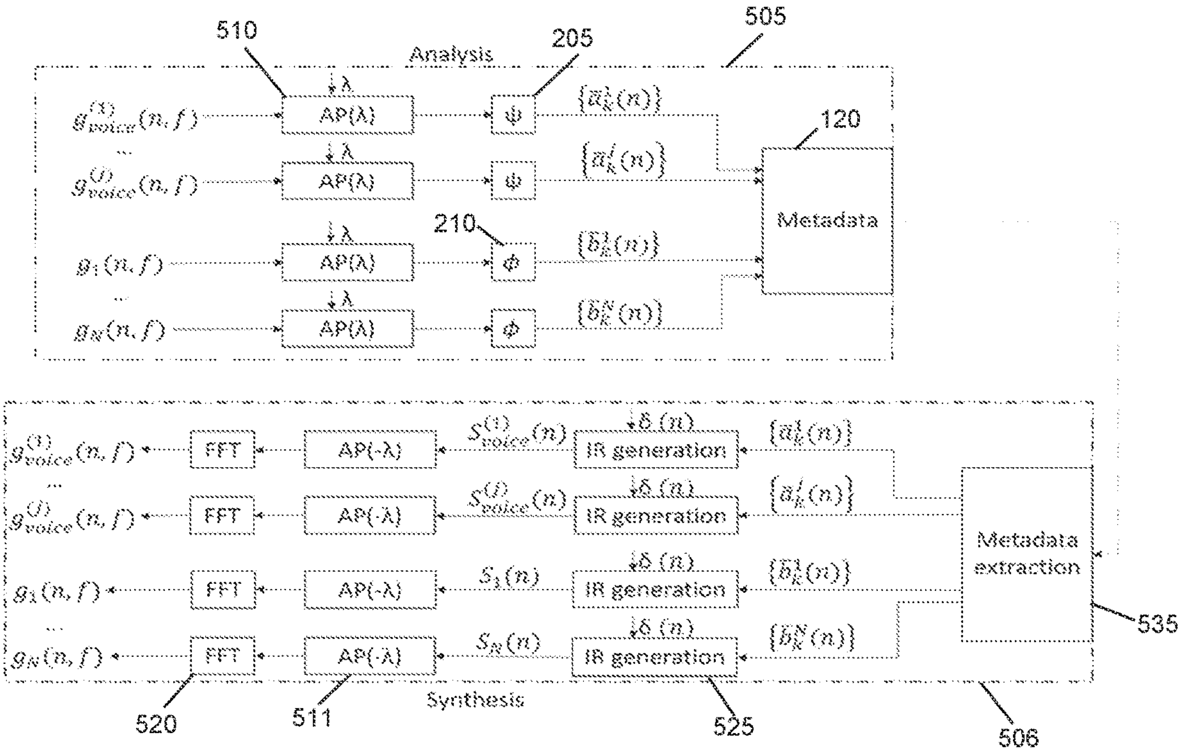
FIG. 5 illustrates a block diagram of yet another upmixing system, according to some embodiments.

FIG. 5 illustrates a block diagram of yet another upmixing system, according to some embodiments. In some embodiments, the processing is performed in analysis block 505 and synthesis block 506. In one or more embodiments, in the analysis block 505, the gains $g_{voice}^{(1)}(n, f)$, $g_{voice}^{(j)}(n, f)$, and $g_1(n, f)$ through $g_N(n, f)$ are each input into all-pass filter cascade (AP(λ)) 510 (where the pole is at k). All-pass based warping with LPC is used to further reduce the number of parameters for metadata (over unwarped-LPC described in [0034] and [0036]) The output of the AP(λ) 510 processing for the gains $g_{voice}^{(1)}(n, f)$, $g_{voice}^{(j)}(n, f)$ are input to metadata compression models ψ 205, and the output from the AP(λ) 510 processing for the gains $g_1(n, f)$ through $g_N(n, f)$ are input to metadata compression models ϕ 210, where ϕ,ψ are, for example, LPC. The output from the metadata compression models ψ 205 ($\{\bar{a}_k^1(n)\} \ldots \{\bar{a}_k^j(n)\}$) and the output from the metadata compression models ϕ 210 ($\{\bar{b}_k^1(n)\} \ldots \{\bar{b}_k^N(n)\}$) are processed resulting in the encoded metadata 120, where $\bar{a}_k$, $\bar{b}_k$ are LPC coefficients in the warped domain, $k=1, \ldots, N \ll f_{max}^{bin}$ (where max=e.g., 2048). The encoded metadata 120 is input to metadata extraction process 535. The output from the metadata extraction process 535 ($\{\bar{a}_k^1(n)\} \ldots \{\bar{a}_k^j(n)\}$ and $\ldots \{\bar{b}_k^N(n)\}$) are input to intermediate representation (IR) generation processes 525 (with input of λ). The output from the IR generation processes 525 ($S_{voice}^{(1)}(n)$, $S_{voice}^{(j)}(n)$, $S_1(n)$ and $S_N(n)$) are input to cascade AP(−λ) 511. The output from the processing of the IR generation processes 525 are input to FFTs 520. The output from the FFTs 520 are the gains $g_{voice}^{(1)}(n, f)$, $g_{voice}^{(2)}(n, f)$, and $g_1(n, f)$ through $g_N(n,f)$.

Figure 6:
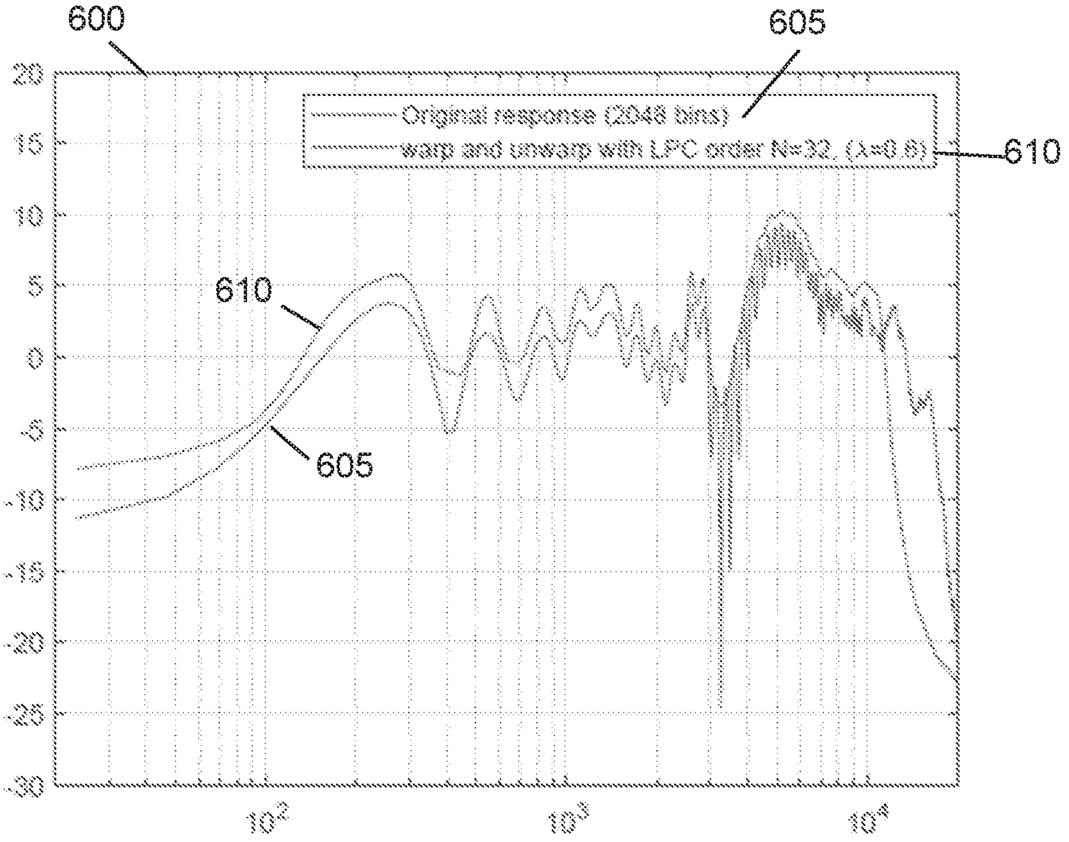
FIG. 6 illustrates another graph for comparison of gain functions, according to some embodiments.

FIG. 6 illustrates another graph for comparison of gain functions, according to some embodiments. In one example embodiment, the original response 605 (2048 bins) curve represents metadata gain values for 2048 FFT bins associated with a gain function g(n, f) at frame n. The warp and unwarp with LPC (order N=32, (λ=0.6) 610 curve represents gain function $\hat{g}(n, f)$ reconstructed with warping/unwarping with AP filters and LPC order 32 (only 32 metadata coefficients transmitted instead of 2048 FFT bin values), frequency-warping with λ=0.6 and unwarping with) λ=−0.6.

Figure 7:
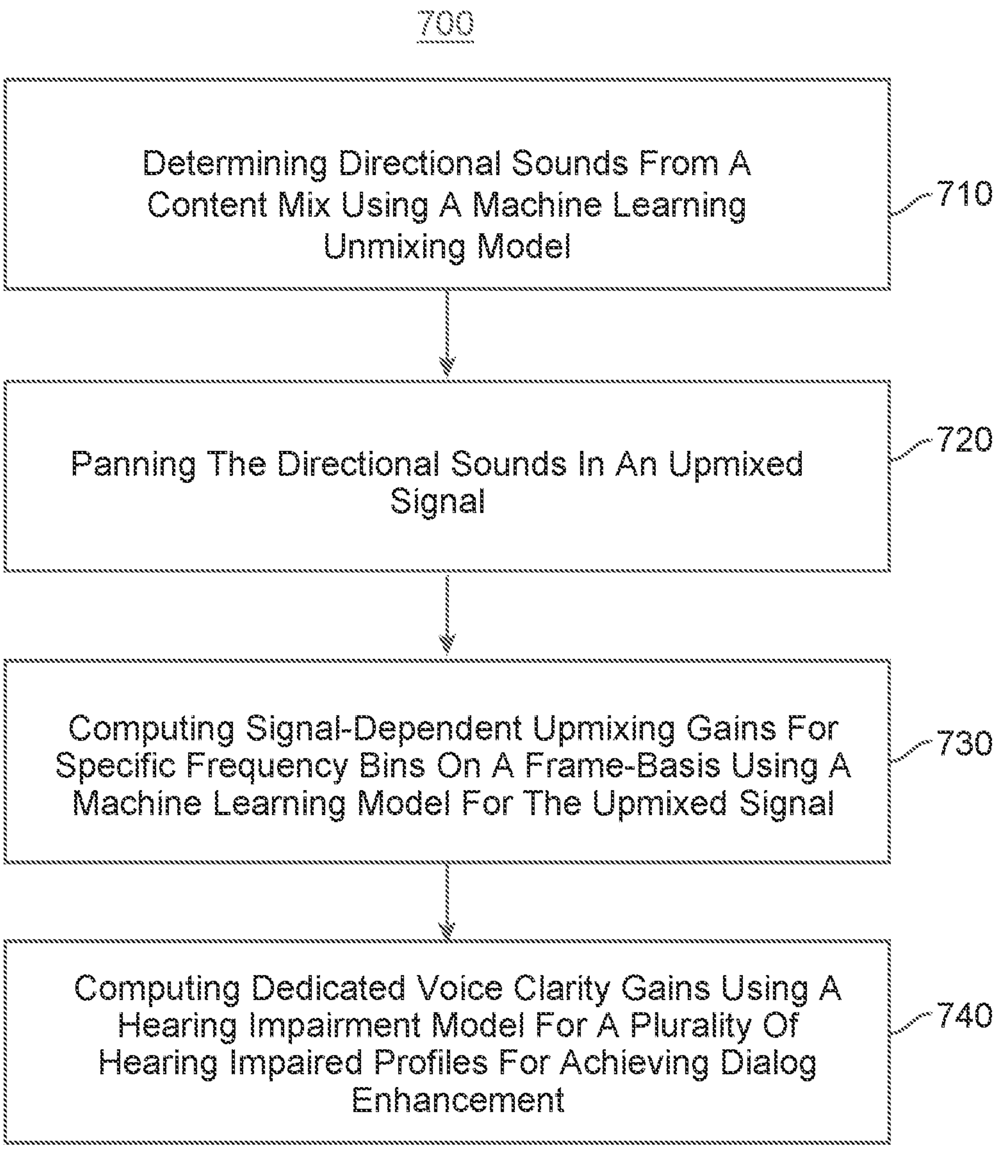
FIG. 7 illustrates a process for a deep learning based upmixing process, according to some embodiments.

FIG. 7 illustrates a process 700 for a deep learning based upmixing process, according to some embodiments. In block 710, process 700 determines directional sounds from a content mix using a machine learning unmixing model. In one or more embodiments, determining directional sounds may be performed by isolating, identifying, detecting, extracting, etc. In block 720, process 700 pans the directional sounds in an upmixed signal. In block 730, process 700 computes signal-dependent upmixing gains for specific frequency bins on a frame-basis using a machine learning model for the upmixed signal. In block 740, process 700 computes dedicated voice clarity gains using a hearing impairment model for multiple hearing-impaired profiles for achieving dialog enhancement. The signal dependent upmixing gains and voice clarity gains are transmitted as metadata with (e.g., along with, alongside, in conjunction with, in a same transmission, etc.) a downmixed signal representing the content mix.

In some embodiments, process 700 further includes performing, by a computing device, a primary-ambience decomposition process for the upmixed signal.

In one or more embodiments, process 700 further includes applying the signal-dependent upmixing gains to downmixed signal components.

In one or more embodiments, process 700 further provides that the content mix comprises a voice content mix.

In some embodiments, process 700 additionally provides that during upmixing, the signal-dependent upmixing gains are applied to primary and ambient signals to generate a final output.

In one or more embodiments, process 700 further provides that the signal-dependent upmixing gains are embedded as audio-codec metadata.

In some embodiments, process 700 further includes the feature that the audio-codec metadata is transmitted with (e.g., along with, alongside, in conjunction with, in a same transmission, etc.) encoded downmixed stereo signals.

In some embodiments, the disclosed technology may be used in cinematic content that is delivered in stereo format, speech and intelligibility enhancement for dialogue-based content, live music content, etc.

One or more embodiments may create a high dynamic range (HDR) 10+ ecosystem-driven upmixer: tie the edge-device (e.g., TV) upmixer parameters to gains for controlling dialog intelligibility. The gain values are computed before encoding and sent as metadata. Time-varying gain is computed before encoding, which eliminates the need of the edge-device from performing compute-intensive processing on a frame-by-frame basis). The upmixer is integrated with the HDR10+ video solution using an open source codec, such as Opus. The upmixer provides for playback on TVs, soundbars, smartphones, etc.

Figure 8:
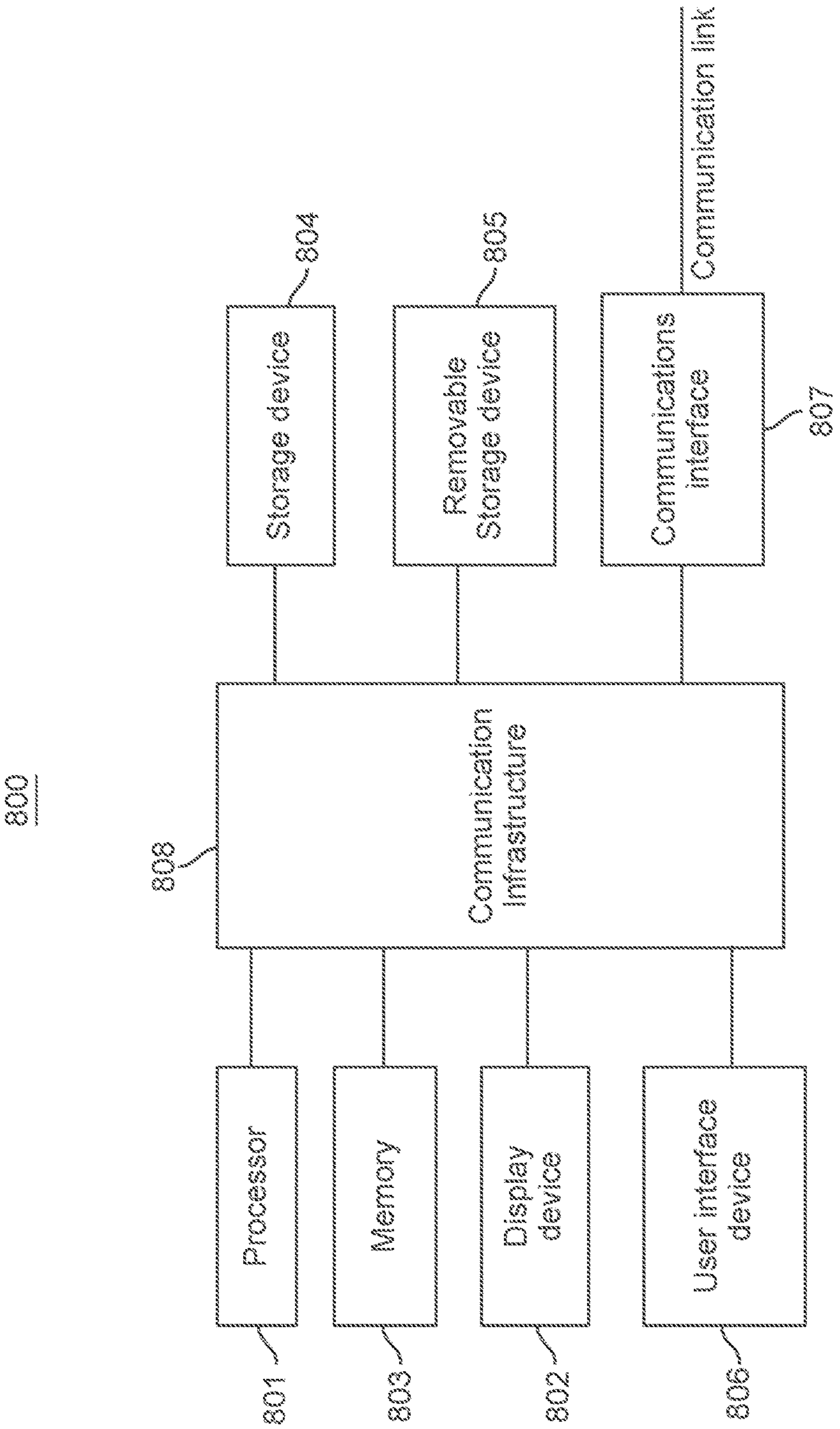
FIG. 8 illustrates a high-level block diagram showing an information processing system comprising a computer system useful for implementing the disclosed embodiments.

FIG. 8 illustrates a high-level block diagram showing an information processing system comprising a computer system 800 useful for implementing the disclosed embodiments. Computer system 800 may be incorporated in an electronic device, such as a television, a sound bar, headphones, earbuds, tablet device, etc. The computer system 800 includes one or more processors 801, and can further include an electronic display device 802 (for displaying video, graphics, text, and other data), a main memory 803 (e.g., random access memory (RAM)), storage device 804 (e.g., hard disk drive), removable storage device 805 (e.g., removable storage drive, removable memory module, a magnetic tape drive, optical disk drive, computer readable medium having stored therein computer software and/or data), user interface device 806 (e.g., keyboard, touch screen, keypad, pointing device), and a communication interface 807 (e.g., modem, a network interface (such as an Ethernet card), a communications port, or a Personal Computer Memory Card International Association (PCMCIA) slot and card). The communication interface 807 allows software and data to be transferred between the computer system and external devices. The system 800 further includes a communications infrastructure 808 (e.g., a communications bus, cross-over bar, or network) to which the aforementioned devices/modules 801 through 807 are connected.

Information transferred via communications interface 807 may be in the form of signals such as electronic, electromagnetic, optical, or other signals capable of being received by communications interface 807, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 700 (FIG. 7) may be stored as program instructions on the memory 803, storage device 804 and the removable storage device 805 for execution by the processor 801.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computing method comprising:

determining directional sounds from a content mix using a machine learning unmixing model;

panning the directional sounds in an upmixed signal;

computing signal-dependent upmixing gains for specific frequency bins on a frame-basis using a machine learning model for the upmixed signal; and computing dedicated voice clarity gains using a hearing impairment model for a plurality of hearing-impaired profiles for achieving dialog enhancement;

wherein the signal dependent upmixing gains and voice clarity gains are transmitted as metadata with a downmixed signal representing the content mix.

2. The method of claim 1, further comprising:

performing, by the computing device, a primary-ambience decomposition process for the upmixed signal.

3. The method of claim 2, further comprising:

applying the signal-dependent upmixing gains to downmixed signal components.

4. The method of claim 2, wherein the content mix comprises a voice content mix.

5. The method of claim 2, wherein during upmixing, the signal-dependent upmixing gains are applied to primary and ambient signals to generate a final output.

6. The method of claim 2, wherein the signal-dependent upmixing gains are embedded as audio-codec metadata.

7. The method of claim 6, wherein the audio-codec metadata is transmitted with encoded downmixed stereo signals.

8. A non-transitory processor-readable medium that includes a program that when executed by a processor performs dialog enhancement of extracted sources of an unmixed signal, comprising:

determining, by the processor, directional sounds from a content mix using a machine learning unmixing model;

panning, by the processor, the directional sounds in an upmixed signal;

computing, by the processor, signal-dependent upmixing gains for specific frequency bins on a frame-basis using a machine learning model for the upmixed signal; and computing, by the processor, dedicated voice clarity gains using a hearing impairment model for a plurality of hearing-impaired profiles for achieving dialog enhancement;

wherein the signal dependent upmixing gains and voice clarity gains are transmitted as metadata with a downmixed signal representing the content mix.

9. The non-transitory processor-readable medium of claim 8, further comprising:

performing, by the processor, a primary-ambience decomposition process for the upmixed signal.

10. The non-transitory processor-readable medium of claim 9, further comprising:

applying the signal-dependent upmixing gains to downmixed signal components.

11. The non-transitory processor-readable medium of claim 9, wherein the content mix comprises a voice content mix.

12. The non-transitory processor-readable medium of claim 9, wherein during upmixing, the signal-dependent upmixing gains are applied to primary and ambient signals to generate a final output.

13. The non-transitory processor-readable medium of claim 9, wherein the signal-dependent upmixing gains are embedded as audio-codec metadata.

14. The non-transitory processor-readable medium of claim 13, wherein the audio-codec metadata is transmitted with encoded downmixed stereo signals.

15. An apparatus comprising:

a memory storing instructions; and at least one processor executes the instructions including a process configured to:

determine directional sounds from a content mix using a machine learning unmixing model;

pan the directional sounds in an upmixed signal;

compute signal-dependent upmixing gains for specific frequency bins on a frame-basis using a machine learning model for the upmixed signal; and compute dedicated voice clarity gains using a hearing impairment model for a plurality of hearing-impaired profiles for achieving dialog enhancement;

wherein the signal dependent upmixing gains and voice clarity gains are transmitted as metadata with a downmixed signal representing the content mix.

16. The apparatus of claim 15, further comprising:

performing, by the computing device, a primary-ambience decomposition process for the upmixed signal.

17. The apparatus of claim 16, further comprising:
applying the signal-dependent upmixing gains to downmixed signal components.

18. The apparatus of claim 16, wherein the content mix comprises a voice content mix.

19. The apparatus of claim 16, wherein during upmixing, the signal-dependent upmixing gains are applied to primary and ambient signals to generate a final output.

20. The apparatus of claim 16, wherein the signal-dependent upmixing gains are embedded as audio-codec metadata, and the audio-codec metadata is transmitted with encoded downmixed stereo signals.

* * * * *